United States Patent
Mahajan et al.

(10) Patent No.: US 8,990,164 B1
(45) Date of Patent: Mar. 24, 2015

(54) SYSTEMS AND METHODS FOR PERFORMING INCREMENTAL BACKUPS

(75) Inventors: Sameer Mahajan, Maharashtra (IN); Pradip Kulkarni, Pune (IN); Dulipsinh Deshmukh, Pune (IN); Nitin Anand, Maharashtra (IN)

(73) Assignee: Symantec Corporation, Mountain View, CA (US)

( * ) Notice: Subject to any disclaimer, the term of this patent is extended or adjusted under 35 U.S.C. 154(b) by 454 days.

(21) Appl. No.: 13/363,982

(22) Filed: Feb. 1, 2012

(51) Int. Cl.
*G06F 17/30* (2006.01)

(52) U.S. Cl.
USPC .......................................... 707/649; 707/652

(58) Field of Classification Search
CPC ............ G06F 11/1451; G06F 11/1469; G06F 11/1461; G06F 17/30067; G06F 17/303; G06F 17/30578
USPC ............................ 707/652, 649; 711/162, 114
See application file for complete search history.

(56) References Cited

U.S. PATENT DOCUMENTS

| | | | | |
|---|---|---|---|---|
| 7,694,086 B1* | 4/2010 | Bezbaruah et al. | ........... | 711/162 |
| 7,769,949 B1* | 8/2010 | Kekre et al. | .................. | 711/114 |
| 8,326,803 B1* | 12/2012 | Stringham | .................... | 707/652 |
| 2006/0005074 A1* | 1/2006 | Yanai et al. | ....................... | 714/5 |
| 2008/0294859 A1* | 11/2008 | Nguyen | ........................ | 711/162 |
| 2010/0077160 A1* | 3/2010 | Liu et al. | ....................... | 711/162 |
| 2010/0077165 A1* | 3/2010 | Lu et al. | ......................... | 711/162 |
| 2011/0004585 A1* | 1/2011 | Becker et al. | ................. | 707/649 |

* cited by examiner

*Primary Examiner* — Monica Pyo
(74) *Attorney, Agent, or Firm* — ALG Intellectual Property, LLC

(57) ABSTRACT

A computer-implemented method for performing incremental backups may include 1) identifying a volume of data previously subjected to a backup, 2) determining a time to perform an incremental backup of the volume, the incremental backup being incremental with respect to the backup, and, at the time of the incremental backup, 3) identifying a list of files changed on the volume since the backup, 4) identifying a map of blocks changed on the volume since the backup, and 5) including, in the incremental backup, each block within at least one file that is indicated as changed in the map of blocks. Various other methods, systems, and computer-readable media are also disclosed.

20 Claims, 6 Drawing Sheets

SYSTEMS AND METHODS FOR PERFORMING INCREMENTAL BACKUPS

BACKGROUND

In the digital age, organizations increasingly rely on digitally-stored data. To protect against data loss, an organization may use a backup system to back up important data. Traditional backup systems may periodically create a full backup by capturing all allocated blocks (e.g., sectors or clusters) of a volume. Between full backups, a backup system may capture intermediate backups, referred to as incremental backups, which include blocks that have changed since the previous incremental or full backup. An incremental backup may be orders of magnitude smaller and faster than a full backup.

Unfortunately, backup systems may consume significant amounts of computing resources. For instance, backups may consume storage space, and transferring data for backing up may consume I/O bandwidth and network bandwidth. Additionally, the more data there is to back up, the longer backup operations may take to perform. For example, traditional backup systems may scan a volume for any changed files in preparation for an incremental backup. As file systems manage an ever-increasing number of files, this overhead may pose significant costs. By competing for computing resources, backup and restore operations may sometimes interfere with the performance of primary applications. Accordingly, the instant disclosure identifies and addresses a need for additional and improved systems and methods for performing incremental backups.

SUMMARY

As will be described in greater detail below, the instant disclosure generally relates to systems and methods for performing incremental backups by backing up only changed blocks of identified changed files. In one example, a computer-implemented method for performing incremental backups may include 1) identifying a volume of data previously subjected to a backup, 2) determining a time to perform an incremental backup of the volume, the incremental backup being incremental with respect to the backup, and, at the time of the incremental backup, 3) identifying a list of files changed on the volume since the backup, 4) identifying a map of blocks changed on the volume since the backup, and 5) including, in the incremental backup, each block within at least one file that is indicated as changed in the map of blocks.

In some examples, the computer-implemented method may also quiesce the volume at the time of the incremental backup. In these examples, the computer-implemented method may also include bringing the volume back online before including, in the incremental backup, each block within the file that is indicated as changed in the map of blocks. Furthermore, the computer-implemented method may also include creating a snapshot of the volume after quiescing the volume and before bringing the volume back online. In these examples, including, in the incremental backup, each block within at least one file that is indicated as changed in the map of blocks may include identifying each block within the file that is indicated as changed in the map of blocks based on the file as represented in the snapshot.

In some embodiments, identifying the list of files may include tracking changes to the files on the volume since the backup with a file system filter driver. Likewise, identifying the map of blocks may include tracking changes to the blocks on the volume since the backup with a block tracking driver. In some examples, identifying the list of files may include 1) intercepting an attempt to open a file with write access on the volume, 2) intercepting an attempt to close the file, and 3) determining that a modification time of the file changed between opening the file and closing the file.

In some examples, the computer-implemented method may further include determining that a first file within the list of files has not changed since the time of the incremental backup. In these examples, including, in the incremental backup, each block within the first file that is indicated as changed in the map of blocks may be performed in response to determining that the first file has not changed. Furthermore, in these examples, the computer-implemented method may also entail including an entire second file within the list of files in the incremental backup in response to determining that the second file has changed since the time of the incremental backup. In one example, determining that the first file within the list of files has not changed may include determining that the first file has not changed while the volume is online. In another example, determining that the second file has changed since the time of the incremental backup may include determining that the second file has changed while the volume is online. As mentioned earlier, the computer-implemented method may also include quiescing the volume at the time of the incremental backup. Accordingly, the computer-implemented method may also include bringing the volume back online before determining that the first file has not changed and before determining that the second file has changed since the time of the incremental backup. In some examples, the computer-implemented method may further include bringing the volume back online before including, in the incremental backup, each block within the file that is indicated as changed in the map of blocks.

In one embodiment, a system for implementing the above-described method may include 1) an identification module programmed to identify a volume of data previously subjected to a backup, 2) a determination module programmed to determine a time to perform an incremental backup of the volume, the incremental backup being incremental with respect to the backup, 3) a file-tracking module programmed to, at the time of the incremental backup, identify a list of files changed on the volume since the backup, 4) a block-tracking module programmed to, at the time of the incremental backup, identify a map of blocks changed on the volume since the backup, and 5) an inclusion module programmed to include, in the incremental backup, each block within at least one file that is indicated as changed in the map of blocks. The system may also include at least one processor configured to execute the identification module, the determination module, the file-tracking module, the block-tracking module, and the inclusion module.

In some examples, the above-described method may be encoded as computer-readable instructions on a computer-readable-storage medium. For example, a computer-readable-storage medium may include one or more computer-executable instructions that, when executed by at least one processor of a computing device, may cause the computing device to 1) identify a volume of data previously subjected to a backup, 2) determine a time to perform an incremental backup of the volume, the incremental backup being incremental with respect to the backup, and, at the time of the incremental backup, 3) identify a list of files changed on the volume since the backup, 4) identify a map of blocks changed on the volume since the backup, and 5) include, in the incremental backup, each block within at least one file that is indicated as changed in the map of blocks.

As will be explained in greater detail below, by backing up only changed blocks of identified changed files, the systems and methods described herein may efficiently and accurately construct incremental backups. Furthermore, in some examples, by tracking changes to files and blocks with a volume as they happen, these systems and methods may avoid a full namespace scan of a file system at the time of an incremental backup, thereby potentially expediting the incremental backup and/or reducing the system load at the time of the incremental backup. Additionally, in some examples these systems and methods may take advantage of advanced capabilities of file systems and storage devices (e.g., snapshot capabilities) to improve the performance and/or reliability of the incremental backup.

Features from any of the above-mentioned embodiments may be used in combination with one another in accordance with the general principles described herein. These and other embodiments, features, and advantages will be more fully understood upon reading the following detailed description in conjunction with the accompanying drawings and claims.

BRIEF DESCRIPTION OF THE DRAWINGS

The accompanying drawings illustrate a number of exemplary embodiments and are a part of the specification. Together with the following description, these drawings demonstrate and explain various principles of the instant disclosure.

Figure 1:
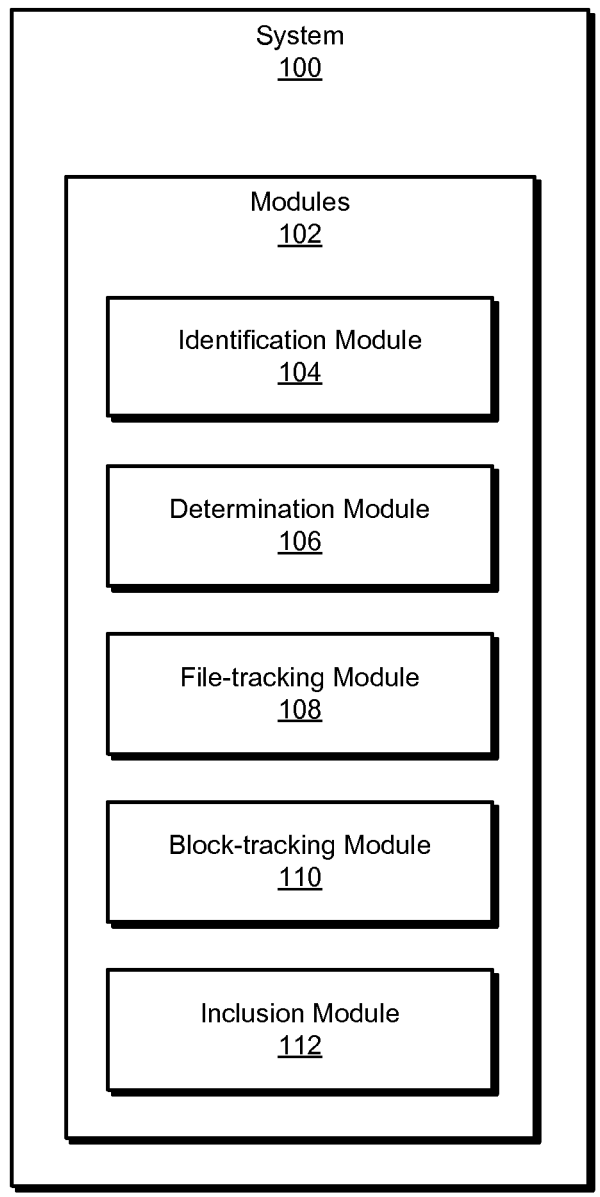
FIG. 1 is a block diagram of an exemplary system for performing incremental backups.

Throughout the drawings, identical reference characters and descriptions indicate similar, but not necessarily identical, elements. While the exemplary embodiments described herein are susceptible to various modifications and alternative forms, specific embodiments have been shown by way of example in the drawings and will be described in detail herein. However, the exemplary embodiments described herein are not intended to be limited to the particular forms disclosed. Rather, the instant disclosure covers all modifications, equivalents, and alternatives falling within the scope of the appended claims.

DETAILED DESCRIPTION OF EXEMPLARY EMBODIMENTS

Figure 2:
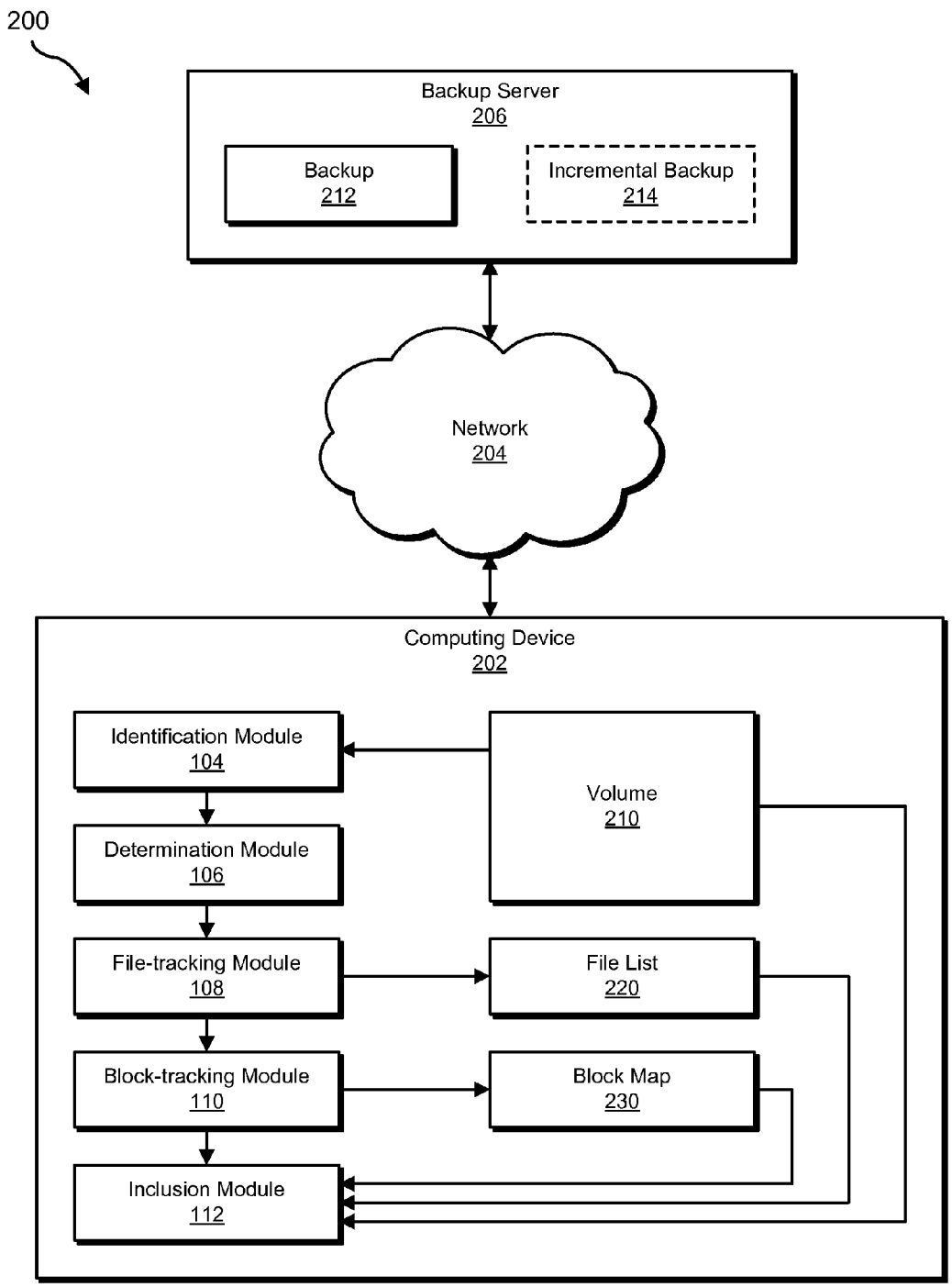
FIG. 2 is a block diagram of an exemplary system for performing incremental backups.
Figure 3:
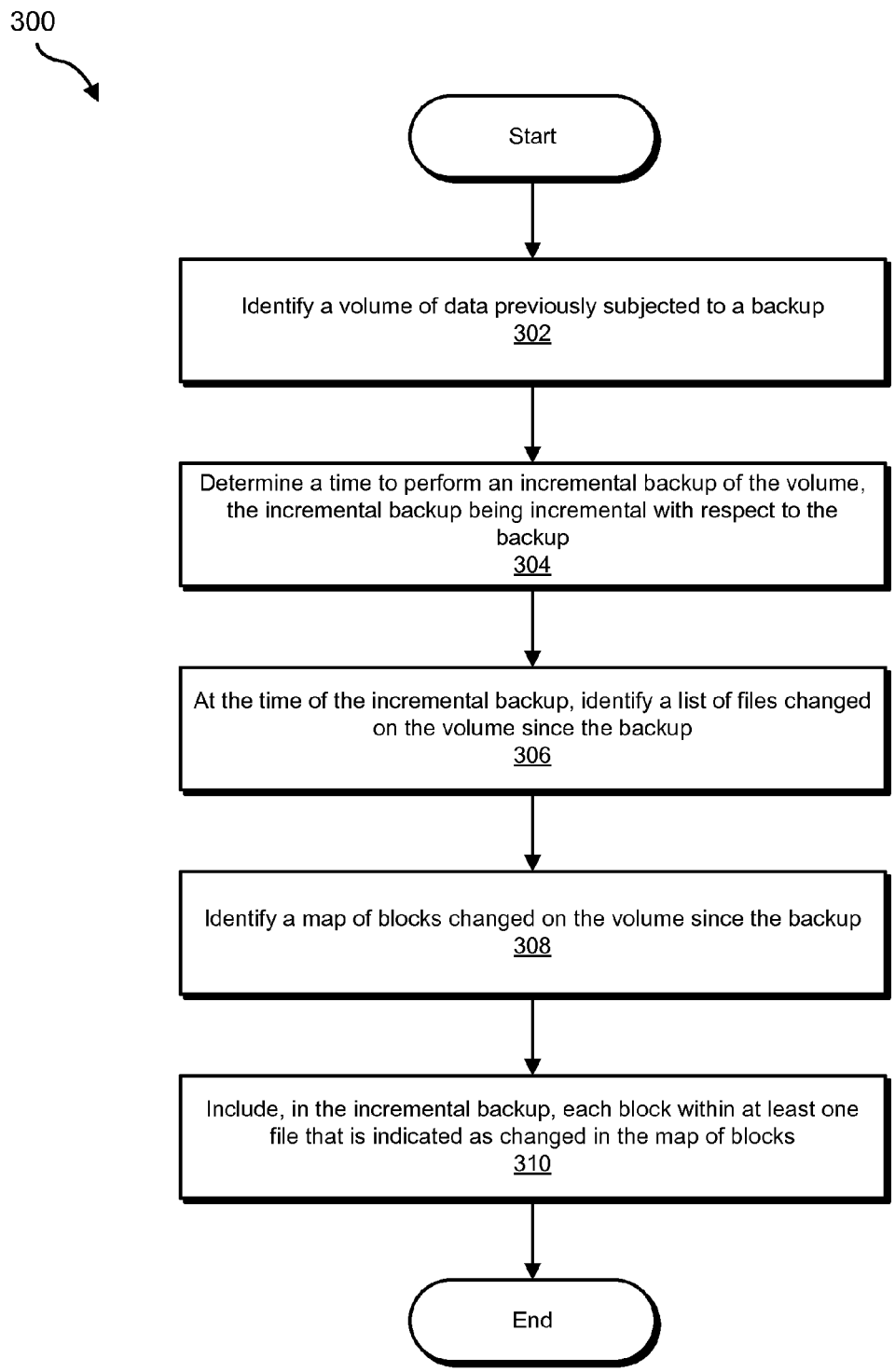
FIG. 3 is a flow diagram of an exemplary method for performing incremental backups.
Figure 4:
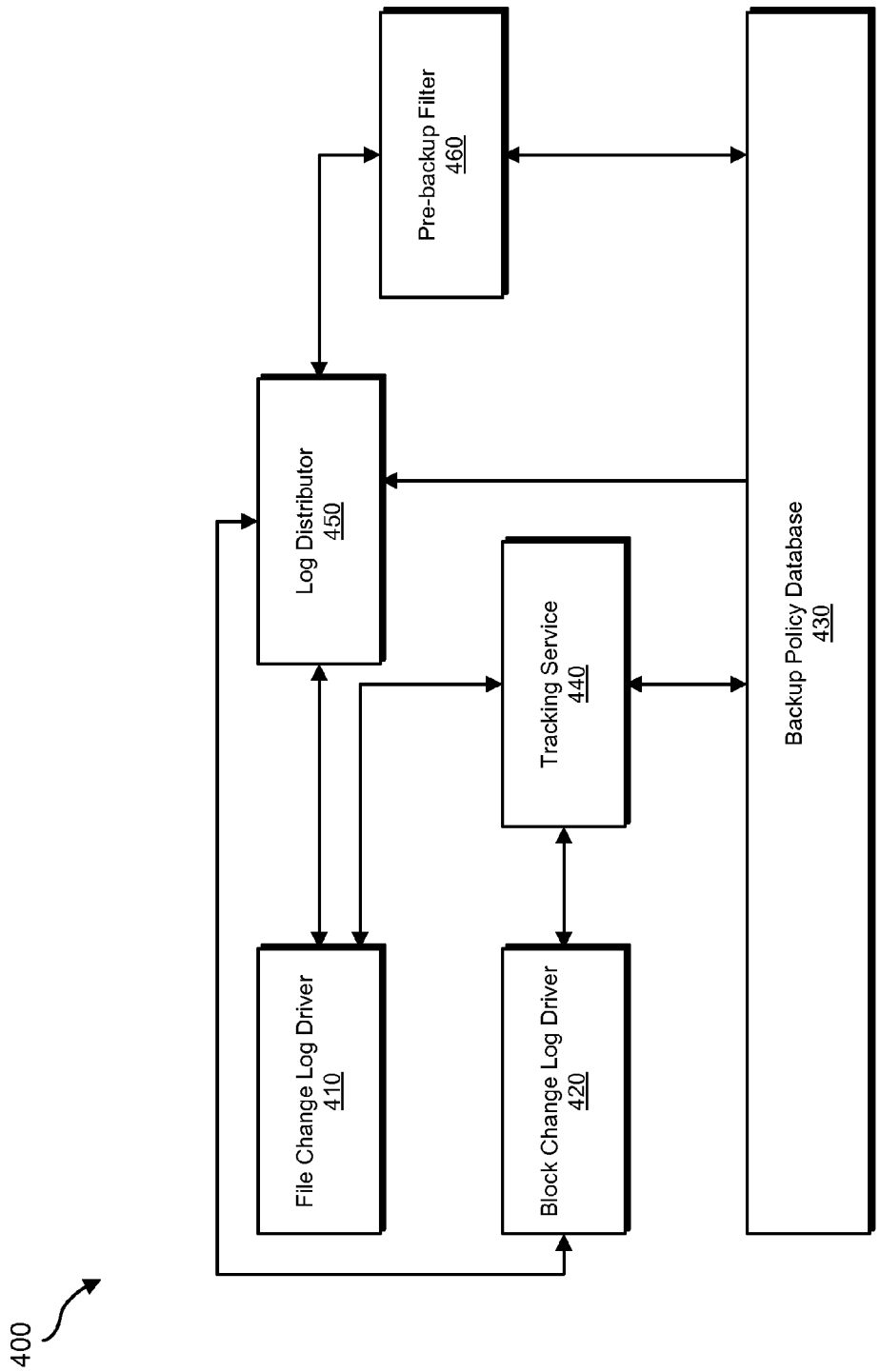
FIG. 4 is a block diagram of an exemplary system for performing incremental backups.

The following will provide, with reference to FIGS. 1, 2, and 4, detailed descriptions of exemplary systems for performing incremental backups. Detailed descriptions of corresponding computer-implemented methods will also be provided in connection with FIG. 3. In addition, detailed descriptions of an exemplary computing system and network architecture capable of implementing one or more of the embodiments described herein will be provided in connection with FIGS. 5 and 6, respectively.

FIG. 1 is a block diagram of an exemplary system 100 for performing incremental backups. As illustrated in this figure, exemplary system 100 may include one or more modules 102 for performing one or more tasks. For example, and as will be explained in greater detail below, exemplary system 100 may include an identification module 104 programmed to identify a volume of data previously subjected to a backup. Exemplary system 100 may also include a determination module 106 programmed to determine a time to perform an incremental backup of the volume, the incremental backup being incremental with respect to the backup. Exemplary system 100 may additionally include a file-tracking module 108 programmed to, at the time of the incremental backup, identify a list of files changed on the volume since the backup. Exemplary system 100 may also include a block-tracking module 110 programmed to, at the time of the incremental backup, identify a map of blocks changed on the volume since the backup.

In addition, and as will be described in greater detail below, exemplary system 100 may include an inclusion module 112 programmed to include, in the incremental backup, each block within at least one file that is indicated as changed in the map of blocks. Although illustrated as separate elements, one or more of modules 102 in FIG. 1 may represent portions of a single module or application.

In certain embodiments, one or more of modules 102 in FIG. 1 may represent one or more software applications or programs that, when executed by a computing device, may cause the computing device to perform one or more tasks. For example, and as will be described in greater detail below, one or more of modules 102 may represent software modules stored and configured to run on one or more computing devices, such as the devices illustrated in FIG. 2 (e.g., computing device 202 and/or backup server 206), computing system 510 in FIG. 5, and/or portions of exemplary network architecture 600 in FIG. 6. One or more of modules 102 in FIG. 1 may also represent all or portions of one or more special-purpose computers configured to perform one or more tasks.

Exemplary system 100 in FIG. 1 may be implemented in a variety of ways. For example, all or a portion of exemplary system 100 may represent portions of exemplary system 200 in FIG. 2. As shown in FIG. 2, system 200 may include a computing device 202 in communication with a backup server 206 via a network 204 (e.g., in order to back up a volume 210 to backup server 206).

In one embodiment, identification module 104, determination module 106, file-tracking module 108, block-tracking module 110, and/or inclusion module 112 may, when executed by at least one processor of computing device 202, facilitate computing device 202 in performing incremental backups. For example, and as will be described in greater detail below, one or more of modules 102 may cause computing device 202 to 1) identify volume 210 previously subjected to a backup 212, 2) determine a time to perform an incremental backup 214 of volume 210, incremental backup 214 being incremental with respect to backup 212, and, at the time of incremental backup 214, 3) identify a file list 220 of files changed on volume 210 since backup 212, 4) identify a block map 230 of blocks changed on volume 210 since backup 212, and 5) include, in incremental backup 214, each block within at least one file that is indicated as changed in block map 230.

Computing device 202 generally represents any type or form of computing device capable of reading computer-executable instructions. Examples of computing device 202 include, without limitation, laptops, desktops, servers, cellular phones, personal digital assistants (PDAs), multimedia players, embedded systems, combinations of one or more of the same, exemplary computing system 510 in FIG. 5, or any other suitable computing device.

Backup server 206 generally represents any type or form of computing device that is capable of requesting, creating, storing, processing, and/or cataloging backup data. Examples of backup server 206 include, without limitation, application servers and database servers configured to provide various database services and/or run certain software applications.

Network 204 generally represents any medium or architecture capable of facilitating communication or data transfer. Examples of network 204 include, without limitation, an intranet, a wide area network (WAN), a local area network (LAN), a storage area network (SAN), a personal area network (PAN), the Internet, power line communications (PLC), a cellular network (e.g., a GSM Network), exemplary network architecture 600 in FIG. 6, or the like. Network 204 may facilitate communication or data transfer using wireless or wired connections. In one embodiment, network 204 may facilitate communication between computing device 202 and backup server 206.

FIG. 3 is a flow diagram of an exemplary computer-implemented method 300 for performing incremental backups. The steps shown in FIG. 3 may be performed by any suitable computer-executable code and/or computing system. In some embodiments, the steps shown in FIG. 3 may be performed by one or more of the components of system 100 in FIG. 1, system 200 in FIG. 2, computing system 510 in FIG. 5, and/or portions of exemplary network architecture 600 in FIG. 6.

As illustrated in FIG. 3, at step 302 one or more of the systems described herein may identify a volume of data previously subjected to a backup. For example, at step 302 identification module 104 may, as part of computing device 202 in FIG. 2, identify volume 210 previously subjected to backup 212.

As used herein, the term "volume" may refer to any discrete and/or defined collection of data. Examples of a volume include, without limitation, a file system partition, a physical disk, a logical volume, a database, and/or a collection of files defined by a backup policy. As used herein, the term "backup" may refer to any procedure to backup, duplicate, and/or protect data and/or the results of any such procedure.

Identification module 104 may identify the volume in any suitable context. For example, identification module 104 may identify the volume by reading a configuration of a backup system to perform the backup of the volume. Additionally or alternatively, identification module 104 may receive a message from the backup system identifying the volume. In some examples, identification module 104 may operate as a part of the backup system and identify the volume of data as the volume scheduled for backup. In some examples, identification module 104 may identify a backup policy that identifies the volume as subject to an incremental backup.

Returning to FIG. 3, at step 304 one or more of the systems described herein may determine a time to perform an incremental backup of the volume, the incremental backup being incremental with respect to the backup. For example, at step 304 determination module 106 may, as part of computing device 202 in FIG. 2, determine a time to perform incremental backup 214 of volume 210, incremental backup 214 being incremental with respect to backup 212.

As used herein, the phrase "incremental backup" generally refers to any data backup that includes less than every data unit (e.g., segment, block, sector, cluster, file, etc.) in a set of data units. For example, an incremental backup may only include data units that have changed since a previous point in time (e.g., the time a previous full backup or other incremental backup was taken). Accordingly, an incremental backup may only include data that has changed (e.g., data that has been modified, added, deleted, etc.) since a previous backup.

Determination module 106 may determine the time to perform the incremental backup in any suitable context. For example, determination module 106 may determine the time by reading a configuration of a backup system set to perform the incremental backup of the volume. Additionally or alternatively, determination module 106 may receive a message from the backup system identifying the time. In some examples, determination module 106 may operate as a part of the backup system and determine the time according a configuration and/or policy of the backup system. In some examples, determination module 106 may identify a backup policy that identifies the backup schedule for the volume that includes the time of the incremental backup and/or criteria to determine the time.

Returning to FIG. 3, at step 306 one or more of the systems described herein may, at the time of the incremental backup, identify a list of files changed on the volume since the backup. For example, at step 306 file-tracking module 108 may, as part of computing device 202 in FIG. 2, at the time of incremental backup 214, identify file list 220 of files changed on volume 210 since backup 212. As used herein, the term "list" may refer to any suitable data structure, including but not limited to a list, a set, a hash table, a log file, etc.

File-tracking module 108 may identify the list of files in any suitable manner. For example, file-tracking module 108 may track changes to the files on the volume since the backup with a file system filter driver. For example, at least a portion of file-tracking module 108 may operate as a part of the file system filter driver. Additionally or alternatively, file-tracking module 108 may identify the list of files as created by the file system filter driver. As used herein, the phrase "filter driver" may refer to any driver configured to add functionality for a device and/or system without replacing a primary driver for the device and/or system.

FIG. 4 illustrates an exemplary system 400 for performing incremental backups. As shown in FIG. 4, exemplary system 400 may include a file change log driver 410. In some examples, file-tracking module 108 may, as a part of one or more modules depicted in FIG. 4, identify the list of files from file change log driver 410.

In some examples, file-tracking module 108 may trap certain calls made within the file system for files on the volume. For example, file-tracking module 108 may intercept an attempt to open a file with write access on the volume (e.g., by checking for one or more flags passed in a call to open the file, such as a write flag, an append flag, a create flag, etc.). File-tracking module 108 may later intercept an attempt to close the file. In this example, file-tracking module 108 may determine the file changed by determining that a modification time of the file remained constant between opening and closing the file.

File-tracking module 108 may trap calls made within the file system in any of a variety of ways. For example, file-tracking module 108 may alter a virtual file system inode cache by hooking a lookup function for an inode (e.g., replacing the original lookup function with a tracking function that additionally calls the original lookup function).

In some examples, file-tracking module 108 may quiesce the volume at the time of the incremental backup. As used herein, the term "quiesce" may refer to any operation for temporarily pausing, stopping, and/or intercepting new transactions (e.g., input/output operations) on a system and/or resource. In some examples, quiescing may also entail completing transactions in progress to ensure a consistent state of a system and/or resource. In one example, file-tracking module 108 may quiesce the volume before identifying the list of files. After quiescing the volume, in some examples one or more of the systems described herein (e.g., a snapshot module) may create a snapshot of the volume before bringing the volume back online. As used herein, the term "snapshot" may refer to any representation of a volume and/or a portion of a volume in a certain state and/or point in time. In some examples, a "snapshot" may refer to a space-saving snapshot (e.g., a snapshot that references a primary volume for unchanged data) and/or a copy-on-write snapshot (e.g., a snapshot that copies protected data as it existed at the time of the snapshot before overwriting the protected data in order to preserve a point-in-time copy of the data). In some examples, the snapshot may include a block-level snapshot (e.g., copying and/or preserving changed blocks).

In some examples, file-tracking module 108 may also preserve a copy of the list of files. For example, after using the list of files (as will be described in greater detail below) to create the incremental backup, file-tracking module 108 may replace the list of files with a new list (e.g., a new log file). However, in order to ensure a correct and complete backup, file-tracking module 108 may preserve a copy of the list of files until the incremental backup job is verified as completed on the backup server. Using FIG. 4 as an example, at least a portion of file-tracking module 108 may, as a part of a tracking service 440, initiate file tracking within file change log driver 410 and/or replace a previous file change log with a new file change log for file change log driver 410.

File-tracking module 108 may operate in any of a variety of contexts. For example, file-tracking module 108 may operate within a guest system (e.g., within a virtual machine) operating on a hypervisor and/or host system. Additionally or alternatively, the file system of the volume may operate as a network file system and file-tracking module 108 may operate on a backup server.

Returning to FIG. 3, at step 308 one or more of the systems described herein may, at the time of the incremental backup, identify a map of blocks changed on the volume since the backup. For example, at step 308 block-tracking module 110 may, as part of computing device 202 in FIG. 2, at the time of incremental backup 214, identify block map 230 of blocks changed on volume 210 since backup 212.

As used herein, the term "map" may refer to any suitable data structure, including but not limited to a bitmap, a list, a set, a hash table, a log file, etc. As used herein, the term "block" may refer to any discrete unit of data. In some examples, the term "block" may refer to a fixed-size unit of data within a file. For example, the term "block" may refer to a block, a cluster, and/or a sector. Additionally or alternatively, in some examples the term "block" may refer to a variable-size unit of data, such as an extent.

Block-tracking module 110 may identify the map of blocks in any suitable manner. For example, block-tracking module 110 may track changes to the blocks on the volume since the backup with a file system filter driver. For example, at least a portion of block-tracking module 110 may operate as a part of the file system filter driver. Additionally or alternatively, block-tracking module 110 may identify the map of blocks as created by the file system filter driver.

The file system filter driver may track changes to blocks in any suitable manner. For example, the file system filter driver may start with a clear bitmap, where each bit corresponds to a block within the volume. Before each write to a block on the volume, the file system filter driver may set the corresponding bit in the bitmap (e.g., to ensure that each write within the volume is reflected in the bitmap).

Using FIG. 4 as an example, exemplary system 400 may include a block change log driver 420. In some examples, block-tracking module 110 may, as a part of one or more modules depicted in FIG. 4, identify the map of blocks from block change log driver 420.

In some examples, block-tracking module 110 may also preserve a copy of the map of blocks. For example, after using the map of blocks (as will be described in greater detail below) to create the incremental backup, block-tracking module 110 may replace the map of blocks with a new list (e.g., a new log file). However, in order to ensure a correct and complete backup, block-tracking module 110 may preserve a copy of the map of blocks until the incremental backup job is verified as completed on the backup server. Using FIG. 4 as an example, at least a portion of block-tracking module 110 may, as a part of a tracking service 440, initiate file tracking within block change log driver 420 and/or replace a previous block change log with a new block change log for block change log driver 420.

Block-tracking module 110 may operate in any of a variety of contexts. For example, block-tracking module 110 may operate within a guest system (e.g., within a virtual machine) operating on a hypervisor and/or host system. Additionally or alternatively, the file system of the volume may operate as a network file system and block-tracking module 110 may operate on a backup server.

Returning to FIG. 3, at step 310 one or more of the systems described herein may, at the time of the incremental backup, include, in the incremental backup, each block within at least one file that is indicated as changed in the map of blocks. For example, at step 310 inclusion module 112 may, as part of computing device 202 in FIG. 2, at the time of incremental backup 214, include, in incremental backup 214, each block within at least one file that is indicated as changed in block map 230.

In some examples, inclusion module 112 may select blocks of modified files for incremental backup unless a modified file has changed since the time of the incremental backup (e.g., when the incremental backup process began), in which case inclusion module 112 may select the entire modified file for incremental backup. For example, inclusion module 112 may determine that a first file within the list of files has not changed since the time of the incremental backup. In this example, inclusion module 112 may include, in the incremental backup, each block within the first file that is indicated as changed in the map of blocks in response to determining that the first file has not changed. Inclusion module 112 may also include an entire second file within the list of files in the incremental backup in response to determining that the second file has changed since the time of the incremental backup.

As mentioned earlier, in some examples one or more systems described herein (e.g., a quiescence module) may have quiesced the volume at the time of the incremental backup. In these examples, one or more systems described herein (e.g., a resuming module) may bring the volume back online before determining that the first file has not changed and before determining that the second file has changed since the time of the incremental backup. In this manner, the systems described herein may process the backup while the volume is online, thereby minimizing interference with the primary function of the volume. Accordingly, in some examples, inclusion module 112 may determine that the first file has not changed while the volume is online (e.g., instead of determining that the first file has not changed after the volume is quiesced and offline). Likewise, inclusion module 112 may determine that the second file has changed since the incremental backup while the volume is online (e.g., instead of determining that the second file has changed after the volume is quiesced and offline).

Similarly, in some examples one or more of the systems described herein (e.g., a resuming module and/or inclusion module 112) may bring the volume back online before including, in the incremental backup, each block within the file that is indicated as changed in the map of blocks. As mentioned earlier, in some examples one or more of the systems described herein may have taken (or caused to be taken) a snapshot of the volume after the volume was quiesced. In these examples, inclusion module 112 may identify each block within the file that is indicated changed in the map of blocks based on the file as represented in the snapshot.

Using FIG. 4 as an example, exemplary system 400 may include a backup policy database 430. In some examples, backup police database 430 may specify an incremental backup job on the volume. Accordingly, tracking service 440 may initiate tracking of any changes to files on the volume since a previous backup (e.g., incremental or full) via file change log driver 410, and any such changes to blocks via block change log driver 420. Log distributor 450 may retrieve relevant logged change information (e.g., from file change log driver 410 and block change log driver 420) based on the policy. A pre-backup filter 460 may then format and/or provide the relevant logged change information from log distributor 450. For example, pre-backup filter 460 may provide block extents for disk blocks relevant to the policy that have changed since the last invocation of the policy. In some examples, one or more systems described herein may then perform an incremental backup based on the block extents provided by pre-backup filter 460.

As explained above, by backing up only changed blocks of identified changed files, the systems and methods described herein may efficiently and accurately construct incremental backups. Furthermore, in some examples, by tracking changes to files and blocks with a volume as they happen, these systems and methods may avoid a full namespace scan of a file system at the time of an incremental backup, thereby potentially expediting the incremental backup and/or reducing the system load at the time of the incremental backup. Additionally, in some examples these systems and methods may take advantage of advanced capabilities of file systems and storage devices (e.g., snapshot capabilities) to improve the performance and/or reliability of the incremental backup.

Figure 5:
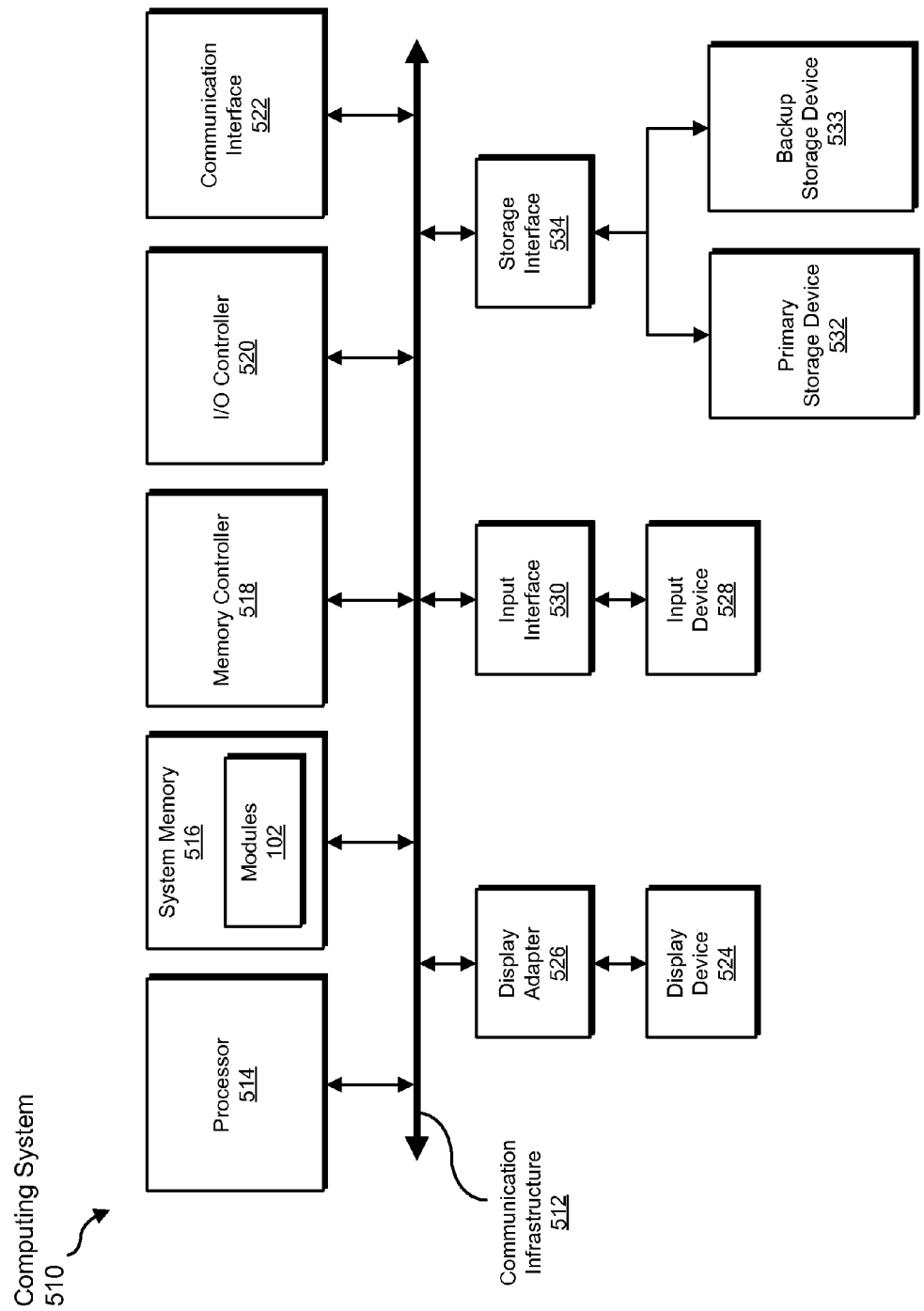
FIG. 5 is a block diagram of an exemplary computing system capable of implementing one or more of the embodiments described and/or illustrated herein.

FIG. 5 is a block diagram of an exemplary computing system 510 capable of implementing one or more of the embodiments described and/or illustrated herein. For example, all or a portion of computing system 510 may perform and/or be a means for performing, either alone or in combination with other elements, one or more of the identifying, determining, quiescing, creating, tracking, intercepting, including, and bringing steps described herein. All or a portion of computing system 510 may also perform and/or be a means for performing any other steps, methods, or processes described and/or illustrated herein.

Computing system 510 broadly represents any single or multi-processor computing device or system capable of executing computer-readable instructions. Examples of computing system 510 include, without limitation, workstations, laptops, client-side terminals, servers, distributed computing systems, handheld devices, or any other computing system or device. In its most basic configuration, computing system 510 may include at least one processor 514 and a system memory 516.

Processor 514 generally represents any type or form of processing unit capable of processing data or interpreting and executing instructions. In certain embodiments, processor 514 may receive instructions from a software application or module. These instructions may cause processor 514 to perform the functions of one or more of the exemplary embodiments described and/or illustrated herein.

System memory 516 generally represents any type or form of volatile or non-volatile storage device or medium capable of storing data and/or other computer-readable instructions. Examples of system memory 516 include, without limitation, random access memory (RAM), read only memory (ROM), flash memory, or any other suitable memory device. Although not required, in certain embodiments computing system 510 may include both a volatile memory unit (such as, for example, system memory 516) and a non-volatile storage device (such as, for example, primary storage device 532, as described in detail below). In one example, one or more of modules 102 from FIG. 1 may be loaded into system memory 516.

In certain embodiments, exemplary computing system 510 may also include one or more components or elements in addition to processor 514 and system memory 516. For example, as illustrated in FIG. 5, computing system 510 may include a memory controller 518, an Input/Output (I/O) controller 520, and a communication interface 522, each of which may be interconnected via a communication infrastructure 512. Communication infrastructure 512 generally represents any type or form of infrastructure capable of facilitating communication between one or more components of a computing device. Examples of communication infrastructure 512 include, without limitation, a communication bus (such as an ISA, PCI, PCIe, or similar bus) and a network.

Memory controller 518 generally represents any type or form of device capable of handling memory or data or controlling communication between one or more components of computing system 510. For example, in certain embodiments memory controller 518 may control communication between processor 514, system memory 516, and I/O controller 520 via communication infrastructure 512.

I/O controller 520 generally represents any type or form of module capable of coordinating and/or controlling the input and output functions of a computing device. For example, in certain embodiments I/O controller 520 may control or facilitate transfer of data between one or more elements of computing system 510, such as processor 514, system memory 516, communication interface 522, display adapter 526, input interface 530, and storage interface 534.

Communication interface 522 broadly represents any type or form of communication device or adapter capable of facilitating communication between exemplary computing system 510 and one or more additional devices. For example, in certain embodiments communication interface 522 may facilitate communication between computing system 510 and a private or public network including additional computing systems. Examples of communication interface 522 include, without limitation, a wired network interface (such as a network interface card), a wireless network interface (such as a wireless network interface card), a modem, and any other suitable interface. In at least one embodiment, communication interface 522 may provide a direct connection to a remote server via a direct link to a network, such as the Internet. Communication interface 522 may also indirectly provide such a connection through, for example, a local area network (such as an Ethernet network), a personal area network, a telephone or cable network, a cellular telephone connection, a satellite data connection, or any other suitable connection.

In certain embodiments, communication interface 522 may also represent a host adapter configured to facilitate communication between computing system 510 and one or more additional network or storage devices via an external bus or communications channel. Examples of host adapters include, without limitation, SCSI host adapters, USB host adapters, IEEE 1394 host adapters, SATA and eSATA host adapters, ATA and PATA host adapters, Fibre Channel interface adapters, Ethernet adapters, or the like. Communication interface 522 may also allow computing system 510 to engage in distributed or remote computing. For example, communication interface 522 may receive instructions from a remote device or send instructions to a remote device for execution.

As illustrated in FIG. 5, computing system 510 may also include at least one display device 524 coupled to communication infrastructure 512 via a display adapter 526. Display device 524 generally represents any type or form of device capable of visually displaying information forwarded by display adapter 526. Similarly, display adapter 526 generally represents any type or form of device configured to forward graphics, text, and other data from communication infrastructure 512 (or from a frame buffer, as known in the art) for display on display device 524.

As illustrated in FIG. 5, exemplary computing system 510 may also include at least one input device 528 coupled to communication infrastructure 512 via an input interface 530. Input device 528 generally represents any type or form of input device capable of providing input, either computer or human generated, to exemplary computing system 510. Examples of input device 528 include, without limitation, a keyboard, a pointing device, a speech recognition device, or any other input device.

As illustrated in FIG. 5, exemplary computing system 510 may also include a primary storage device 532 and a backup storage device 533 coupled to communication infrastructure 512 via a storage interface 534. Storage devices 532 and 533 generally represent any type or form of storage device or medium capable of storing data and/or other computer-readable instructions. For example, storage devices 532 and 533 may be a magnetic disk drive (e.g., a so-called hard drive), a solid state drive, a floppy disk drive, a magnetic tape drive, an optical disk drive, a flash drive, or the like. Storage interface 534 generally represents any type or form of interface or device for transferring data between storage devices 532 and 533 and other components of computing system 510.

In certain embodiments, storage devices 532 and 533 may be configured to read from and/or write to a removable storage unit configured to store computer software, data, or other computer-readable information. Examples of suitable removable storage units include, without limitation, a floppy disk, a magnetic tape, an optical disk, a flash memory device, or the like. Storage devices 532 and 533 may also include other similar structures or devices for allowing computer software, data, or other computer-readable instructions to be loaded into computing system 510. For example, storage devices 532 and 533 may be configured to read and write software, data, or other computer-readable information. Storage devices 532 and 533 may also be a part of computing system 510 or may be a separate device accessed through other interface systems.

Many other devices or subsystems may be connected to computing system 510. Conversely, all of the components and devices illustrated in FIG. 5 need not be present to practice the embodiments described and/or illustrated herein. The devices and subsystems referenced above may also be interconnected in different ways from that shown in FIG. 5. Computing system 510 may also employ any number of software, firmware, and/or hardware configurations. For example, one or more of the exemplary embodiments disclosed herein may be encoded as a computer program (also referred to as computer software, software applications, computer-readable instructions, or computer control logic) on a computer-readable-storage medium. The phrase "computer-readable-storage medium" generally refers to any form of device, carrier, or medium capable of storing or carrying computer-readable instructions. Examples of computer-readable-storage media include, without limitation, transmission-type media, such as carrier waves, and physical media, such as magnetic-storage media (e.g., hard disk drives and floppy disks), optical-storage media (e.g., CD- or DVD-ROMs), electronic-storage media (e.g., solid-state drives and flash media), and other distribution systems.

The computer-readable-storage medium containing the computer program may be loaded into computing system 510. All or a portion of the computer program stored on the computer-readable-storage medium may then be stored in system memory 516 and/or various portions of storage devices 532 and 533. When executed by processor 514, a computer program loaded into computing system 510 may cause processor 514 to perform and/or be a means for performing the functions of one or more of the exemplary embodiments described and/or illustrated herein. Additionally or alternatively, one or more of the exemplary embodiments described and/or illustrated herein may be implemented in firmware and/or hardware. For example, computing system 510 may be configured as an application specific integrated circuit (ASIC) adapted to implement one or more of the exemplary embodiments disclosed herein.

Figure 6:
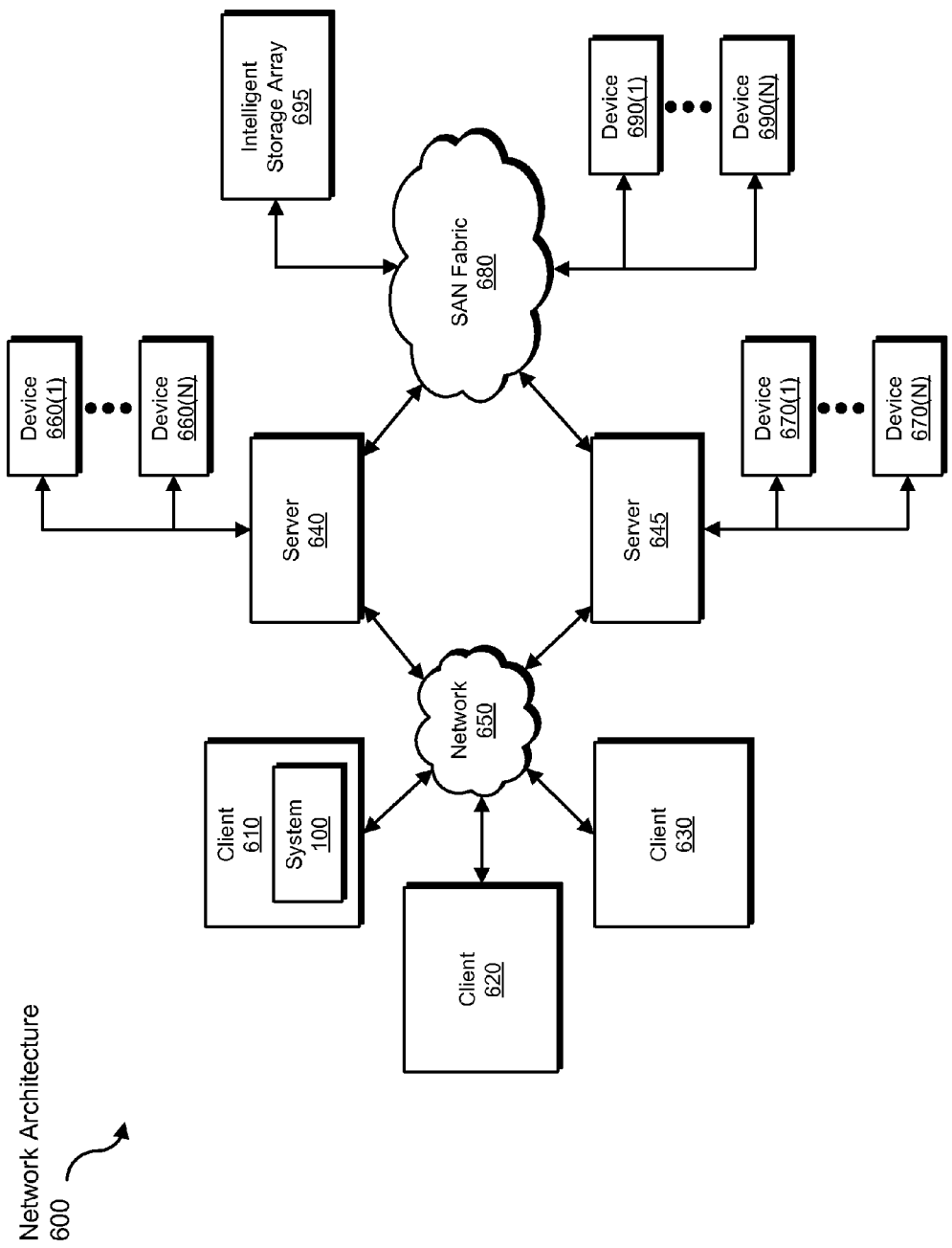
FIG. 6 is a block diagram of an exemplary computing network capable of implementing one or more of the embodiments described and/or illustrated herein.

FIG. 6 is a block diagram of an exemplary network architecture 600 in which client systems 610, 620, and 630 and servers 640 and 645 may be coupled to a network 650. As detailed above, all or a portion of network architecture 600 may perform and/or be a means for performing, either alone or in combination with other elements, one or more of the identifying, determining, quiescing, creating, tracking, intercepting, including, and bringing steps disclosed herein. All or a portion of network architecture 600 may also be used to perform and/or be a means for performing other steps and features set forth in the instant disclosure.

Client systems 610, 620, and 630 generally represent any type or form of computing device or system, such as exemplary computing system 510 in FIG. 5. Similarly, servers 640 and 645 generally represent computing devices or systems, such as application servers or database servers, configured to provide various database services and/or run certain software applications. Network 650 generally represents any telecommunication or computer network including, for example, an intranet, a wide area network (WAN), a local area network (LAN), a personal area network (PAN), or the Internet. In one example, client systems 610, 620, and/or 630 and/or servers 640 and/or 645 may include all or a portion of system 100 from FIG. 1.

As illustrated in FIG. 6, one or more storage devices 660(1)-(N) may be directly attached to server 640. Similarly, one or more storage devices 670(1)-(N) may be directly attached to server 645. Storage devices 660(1)-(N) and storage devices 670(1)-(N) generally represent any type or form of storage device or medium capable of storing data and/or other computer-readable instructions. In certain embodiments, storage devices 660(1)-(N) and storage devices 670(1)-(N) may represent network-attached storage (NAS) devices configured to communicate with servers 640 and 645 using various protocols, such as NFS, SMB, or CIFS.

Servers 640 and 645 may also be connected to a storage area network (SAN) fabric 680. SAN fabric 680 generally represents any type or form of computer network or architecture capable of facilitating communication between a plurality of storage devices. SAN fabric 680 may facilitate communication between servers 640 and 645 and a plurality of storage devices 690(1)-(N) and/or an intelligent storage array 695. SAN fabric 680 may also facilitate, via network 650 and servers 640 and 645, communication between client systems 610, 620, and 630 and storage devices 690(1)-(N) and/or intelligent storage array 695 in such a manner that devices 690(1)-(N) and array 695 appear as locally attached devices to client systems 610, 620, and 630. As with storage devices 660(1)-(N) and storage devices 670(1)-(N), storage devices 690(1)-(N) and intelligent storage array 695 generally represent any type or form of storage device or medium capable of storing data and/or other computer-readable instructions.

In certain embodiments, and with reference to exemplary computing system 510 of FIG. 5, a communication interface, such as communication interface 522 in FIG. 5, may be used to provide connectivity between each client system 610, 620, and 630 and network 650. Client systems 610, 620, and 630 may be able to access information on server 640 or 645 using, for example, a web browser or other client software. Such software may allow client systems 610, 620, and 630 to access data hosted by server 640, server 645, storage devices 660(1)-(N), storage devices 670(1)-(N), storage devices 690(1)-(N), or intelligent storage array 695. Although FIG. 6 depicts the use of a network (such as the Internet) for exchanging data, the embodiments described and/or illustrated herein are not limited to the Internet or any particular network-based environment.

In at least one embodiment, all or a portion of one or more of the exemplary embodiments disclosed herein may be encoded as a computer program and loaded onto and executed by server 640, server 645, storage devices 660(1)-(N), storage devices 670(1)-(N), storage devices 690(1)-(N), intelligent storage array 695, or any combination thereof. All or a portion of one or more of the exemplary embodiments disclosed herein may also be encoded as a computer program, stored in server 640, run by server 645, and distributed to client systems 610, 620, and 630 over network 650.

As detailed above, computing system 510 and/or one or more components of network architecture 600 may perform and/or be a means for performing, either alone or in combination with other elements, one or more steps of an exemplary method for performing incremental backups.

While the foregoing disclosure sets forth various embodiments using specific block diagrams, flowcharts, and examples, each block diagram component, flowchart step, operation, and/or component described and/or illustrated herein may be implemented, individually and/or collectively, using a wide range of hardware, software, or firmware (or any combination thereof) configurations. In addition, any disclosure of components contained within other components should be considered exemplary in nature since many other architectures can be implemented to achieve the same functionality.

In some examples, all or a portion of exemplary system 100 in FIG. 1 may represent portions of a cloud-computing or network-based environment. Cloud-computing environments may provide various services and applications via the Internet. These cloud-based services (e.g., software as a service, platform as a service, infrastructure as a service, etc.) may be accessible through a web browser or other remote interface. Various functions described herein may be provided through a remote desktop environment or any other cloud-based computing environment.

The process parameters and sequence of steps described and/or illustrated herein are given by way of example only and can be varied as desired. For example, while the steps illustrated and/or described herein may be shown or discussed in a particular order, these steps do not necessarily need to be performed in the order illustrated or discussed. The various exemplary methods described and/or illustrated herein may also omit one or more of the steps described or illustrated herein or include additional steps in addition to those disclosed.

While various embodiments have been described and/or illustrated herein in the context of fully functional computing systems, one or more of these exemplary embodiments may be distributed as a program product in a variety of forms, regardless of the particular type of computer-readable-storage media used to actually carry out the distribution. The embodiments disclosed herein may also be implemented using software modules that perform certain tasks. These software modules may include script, batch, or other executable files that may be stored on a computer-readable storage medium or in a computing system. In some embodiments, these software modules may configure a computing system to perform one or more of the exemplary embodiments disclosed herein.

In addition, one or more of the modules described herein may transform data, physical devices, and/or representations of physical devices from one form to another. For example, one or more of the modules recited herein may transform a computing system into a system for performing incremental backups.

The preceding description has been provided to enable others skilled in the art to best utilize various aspects of the exemplary embodiments disclosed herein. This exemplary description is not intended to be exhaustive or to be limited to any precise form disclosed. Many modifications and variations are possible without departing from the spirit and scope of the instant disclosure. The embodiments disclosed herein should be considered in all respects illustrative and not restrictive. Reference should be made to the appended claims and their equivalents in determining the scope of the instant disclosure.

Unless otherwise noted, the terms "a" or "an," as used in the specification and claims, are to be construed as meaning "at least one of." In addition, for ease of use, the words "including" and "having," as used in the specification and claims, are interchangeable with and have the same meaning as the word "comprising."

What is claimed is:

1. A computer-implemented method for performing incremental backups, at least a portion of the method being performed by a computing device comprising at least one processor, the method comprising:

identifying a volume of data previously subjected to a backup;

determining a time to perform an incremental backup of the volume, the incremental backup being incremental with respect to the backup;

at the time of the incremental backup, identifying a list of files changed on the volume since the backup;

determining that a first file, identified as changed in the list of files, has not changed since the time of the incremental backup and that a second file, identified as changed in the list of files, has changed since the time of the incremental backup;

in response to determining that the first file has not changed since the time of the incremental backup and the second file has changed since the time of the incremental backup:

identifying, in a map of blocks changed on the volume since the backup, each block within the first file that is indicated as changed since the backup, wherein:

the map of blocks comprises a bitmap, each bit corresponding to a block within the volume;

the bitmap starts, after the backup, as a clear bitmap;

before each write to a block on the volume, a corresponding bit is set in the bitmap to ensure that each write within the volume is reflected in the bitmap;

including, in the incremental backup:

each block within the first file that is indicated as changed in the map of blocks;

the entire second file.

2. The computer-implemented method of claim 1, wherein the map of blocks tracks changes to the blocks on the volume since the backup within a block tracking driver.

3. The computer-implemented method of claim 1, further comprising:

quiescing the volume at the time of the incremental backup;

bringing the volume back online before determining that the first file has not changed since the time of the incremental backup and before determining that the second file has changed since the time of the incremental backup.

4. The computer-implemented method of claim 3, wherein:

determining that the first file has not changed since the time of the incremental backup comprises determining that the first file has not changed while the volume is online;

determining that the second file has changed since the time of the incremental backup comprises determining that the second file has changed while the volume is online.

5. The computer-implemented method of claim 1, wherein:

identifying the list of files changed on the volume since the backup comprises tracking changes to the files on the volume since the backup within a file system filter driver.

6. The computer-implemented method of claim 5, wherein tracking changes to the files on the volume comprises:

intercepting an attempt to open a file with write access on the volume;

intercepting an attempt to close the file;

determining that a modification time of the file changed between opening the file and closing the file.

7. The computer-implemented method of claim 1, further comprising:

quiescing the volume at the time of the incremental backup;

bringing the volume back online before including, in the incremental backup, each block within the first file that is indicated as changed in the map of blocks.

8. The computer-implemented method of claim 7, further comprising creating a snapshot of the volume after quiescing the volume and before bringing the volume back online;

wherein identifying, in the map of blocks changed on the volume since the backup, each block within the first file that is indicated as changed since the backup comprises identifying each block within the first file that is indicated as changed in the map of blocks based on the first file as represented in the snapshot.

9. A system for performing incremental backups, the system comprising:

an identification module programmed to identify a volume of data previously subjected to a backup;

a determination module programmed to determine a time to perform an incremental backup of the volume, the incremental backup being incremental with respect to the backup;

a file-tracking module programmed to, at the time of the incremental backup, identify a list of files changed on the volume since the backup;

an inclusion module programmed to:

determine that a first file, identified as changed in the list of files, has not changed since the time of the incremental backup and that a second file, identified as changed in the list of files, has changed since the time of the incremental backup;

in response to determining that the first file has not changed since the time of the incremental backup and the second file has changed since the time of incremental backup:

identify, in a map of blocks changed on the volume since the backup, each block within the first file that is indicated as changed since the backup, wherein:

the map of blocks comprises a bitmap, each bit corresponding to a block within the volume;

the bitmap starts, after the backup, as a clear bitmap;

before each write to a block on the volume, a corresponding bit is set in the bitmap to ensure that each write within the volume is reflected in the bitmap;

include, in the incremental backup:

each block within the first file that is indicated as changed in the map of blocks;

the entire second file;

at least one processor configured to execute the identification module, the determination module, the file-tracking module, and the inclusion module.

10. The system of claim 9, wherein the system comprises a block-tracking module programmed to track the changes to the blocks on the volume since the backup within a block tracking driver.

11. The system of claim 9, further comprising:

a quiescence module programmed to quiesce the volume at the time of the incremental backup;

a resuming module programmed to bring the volume back online before determining that the first file has not changed since the time of the incremental backup and before determining that the second file has changed since the time of the incremental backup.

12. The system of claim 11, wherein:

the inclusion module is programmed to determine that the first file has not changed since the time of the incremental backup by determining that the first file has not changed while the volume is online;

the inclusion module is programmed to determine that the second file has changed since the time of the incremental backup by determining that the second file has changed while the volume is online.

13. The system of claim 9, wherein:

the file-tracking module is programmed to identify the list of files changed on the volume since the backup by tracking changes to the files on the volume since the backup within a file system filter driver.

14. The system of claim 13, wherein the file-tracking module is programmed to track changes to the files on the volume by:

intercepting an attempt to open a file with write access on the volume;

intercepting an attempt to close the file;

determining that a modification time of the file changed between opening the file and closing the file.

15. The system of claim 9, further comprising:
a quiescence module programmed to quiesce the volume at the time of the incremental backup;
a resuming module programmed to bring the volume back online before including, in the incremental backup, each block within the first file that is indicated as changed in the map of blocks.

16. The system of claim 15,
further comprising a snapshot module programmed to create a snapshot of the volume after quiescing the volume and before bringing the volume back online;
wherein the inclusion module is programmed to identify, in the map of blocks changed on the volume since the backup, each block within the first file that is indicated as changed since the backup by identifying each block within the first file that is indicated as changed in the map of blocks based on the first file as represented in the snapshot.

17. A non-transitory computer-readable-storage medium comprising one or more computer-executable instructions that, when executed by at least one processor of a computing device, cause the computing device to:
identify a volume of data previously subjected to a backup;
determine a time to perform an incremental backup of the volume, the incremental backup being incremental with respect to the backup;
at the time of the incremental backup, identify a list of files changed on the volume since the backup;
determine that a first file, identified as changed in the list of files, has not changed since the time of the incremental backup and that a second file, identified as changed in the list of files, has changed since the time of the incremental backup;
in response to determining that the first file has not changed since the time of the incremental backup and the second file has changed since the time of the incremental backup:
identify, in a map of blocks changed on the volume since the backup, each block within the first file that is indicated as changed since the backup, wherein:
the map of blocks comprises a bitmap, each bit corresponding to a block within the volume;
the bitmap starts, after the backup, as a clear bitmap;
before each write to a block on the volume, a corresponding bit is set in the bitmap to ensure that each write within the volume is reflected in the bitmap;
include, in the incremental backup:
each block within the first file that is indicated as changed in the map of blocks;
the entire second file.

18. The non-transitory computer-readable-storage medium of claim 17,
wherein the one or more computer executable instructions cause the computing device to:
identify the list of files changed on the volume since the backup by tracking changes to the files on the volume since the backup within a file system filter driver;
identify the map of blocks changed on the volume since the backup by tracking changes to the blocks on the volume since the backup within a block tracking driver.

19. The non-transitory computer-readable-storage medium of claim 17, wherein the one or more computer executable instructions further cause the computing device to:
quiesce the volume at the time of the incremental backup;
bring the volume back online before determining that the first file has not changed since the time of the incremental backup and before determining that the second file has changed since the time of the incremental backup.

20. The non-transitory computer-readable-storage medium of claim 19, wherein:
the one or more computer executable instructions cause the computing device to determine that the first file has not changed since the time of the incremental backup by causing the computing device to determine that the first file has not changed while the volume is online;
the one or more computer executable instructions cause the computing device to determine that the second file has changed since the time of the incremental backup by causing the computing device to determine that the second file has changed while the volume is online.

* * * * *